United States Patent
Wei

(10) Patent No.: US 12,395,819 B2
(45) Date of Patent: Aug. 19, 2025

(54) VEHICLE-TO-X-BASED DATA PROCESSING METHOD AND APPARATUS, AND VEHICLE-TO-X-BASED CERTIFICATE APPLICATION METHOD AND APPARATUS

(71) Applicant: ZTE CORPORATION, Shenzhen (CN)

(72) Inventor: Xingyuan Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 96 days.

(21) Appl. No.: 18/578,345

(22) PCT Filed: Mar. 31, 2022

(86) PCT No.: PCT/CN2022/084666
§ 371 (c)(1),
(2) Date: Jan. 11, 2024

(87) PCT Pub. No.: WO2023/010872
PCT Pub. Date: Feb. 9, 2023

(65) Prior Publication Data
US 2024/0323661 A1    Sep. 26, 2024

(30) Foreign Application Priority Data
Aug. 5, 2021    (CN) .......................... 202110897477.4

(51) Int. Cl.
*H04L 9/32*    (2006.01)
*H04L 9/08*    (2006.01)
(Continued)

(52) U.S. Cl.
CPC ............... *H04W 4/40* (2018.02); *H04W 4/12* (2013.01); *H04W 12/069* (2021.01)

(58) Field of Classification Search
CPC ........ H04W 4/40; H04W 12/069; H04W 4/12
(Continued)

(56) References Cited

U.S. PATENT DOCUMENTS 8,458,315 B2 *    6/2013    Miche .................. H04W 4/029
                                                               709/224
11,323,249 B2 *    5/2022    Kupwade Patil ..... H04L 9/3268
(Continued)

FOREIGN PATENT DOCUMENTS

| CN | 103973760 A | 8/2014 |
|---|---|---|
| CN | 110418309 A | 11/2019 |

(Continued)

OTHER PUBLICATIONS

3GPP Technical Specification Group Service and System Aspects. "Change Request—V2X priority to other services," 3GPP TSG-SA WG1 Meeting #74, May 2016, pp. 1-4.
(Continued)

*Primary Examiner* — Haresh N Patel
(74) *Attorney, Agent, or Firm* — Vivacqua Crane, PLLC

(57) ABSTRACT

A Vehicle-to-X-based data processing method, a Vehicle-to-X-based certificate application method, a vehicle-mounted terminal, a computer device, and a readable medium are disclosed. The method may include determine a message type of a first CVIS message in response to a reception of both the first CVIS message and a certificate broadcast by a first OBU, and acquiring a categorical attribute from the certificate; where the categorical attribute is the categorical attribute of a vehicle to which the first OBU belongs; determining a first processing priority of the first CVIS message corresponding to the categorical attribute according to a preset mapping relationship between the categorical attributes and the processing priority; and processing the first CVIS message and the second CVIS message, accord-
(Continued)

ing to the message type, the first processing priority, and the second processing priority of the second CVIS message that is currently being processed.

20 Claims, 4 Drawing Sheets

(51) Int. Cl.
*H04W 4/12* (2009.01)
*H04W 4/40* (2018.01)
*H04W 12/069* (2021.01)

(58) Field of Classification Search
USPC ............................................. 713/175
See application file for complete search history.

(56) References Cited

U.S. PATENT DOCUMENTS

| | | | | |
|---|---|---|---|---|
| 2014/0358324 | A1* | 12/2014 | Sagar | G08G 1/164 |
| | | | | 701/1 |
| 2015/0256347 | A1* | 9/2015 | Tseng | H04L 9/3236 |
| | | | | 713/158 |
| 2015/0318996 | A1 | 11/2015 | van Roermund | |
| 2016/0140842 | A1* | 5/2016 | Park | G08G 1/0112 |
| | | | | 340/905 |
| 2018/0040246 | A1 | 2/2018 | Yonemura et al. | |
| 2018/0114441 | A1* | 4/2018 | Marmet | G01C 21/30 |
| 2019/0149342 | A1* | 5/2019 | Fynaardt | H04L 63/20 |
| | | | | 713/156 |
| 2019/0245831 | A1* | 8/2019 | Petit | H04L 63/0823 |
| 2019/0311616 | A1* | 10/2019 | Jin | G05D 1/0297 |
| 2019/0312896 | A1* | 10/2019 | Petit | H04W 4/46 |
| 2021/0014655 | A1* | 1/2021 | Stählin | H04W 4/40 |
| 2021/0160086 | A1* | 5/2021 | Meyer | H04L 63/0823 |

FOREIGN PATENT DOCUMENTS

| | | | | |
|---|---|---|---|---|
| CN | 110992691 A | | 4/2020 | |
| CN | 112449318 A | | 3/2021 | |
| JP | 2017046080 A | | 3/2017 | |
| KR | 20190011508 A | * | 2/2019 | ............ G08G 1/166 |

OTHER PUBLICATIONS

International Searching Authority. International Search Report and Written Opinion for PCT Application No. PCT/CN2022/084666 and English translation, mailed Jul. 1, 2022, pp. 1-10.
Buchenscheit, A., et al. "A VANET-based emergency vehicle warning system," 2009 IEEE Vehicular Networking Conference, pp. 1-8.
ETSI Intelligent Transportation Systems (ITS). "AT Comments on Draft ETSI EN 302 637-2 V1.3.0," AT_37126, 2013, pp. 1-6.
European Patent Office. Extended European Search Report for EP Application No. 22851597.9, mailed Oct. 11, 2024, pp. 1-11.

* cited by examiner

VEHICLE-TO-X-BASED DATA PROCESSING METHOD AND APPARATUS, AND VEHICLE-TO-X-BASED CERTIFICATE APPLICATION METHOD AND APPARATUS

CROSS-REFERENCE TO RELATED APPLICATION

This application is a national stage filing under 35 U.S.C. § 371 of international application number PCT/CN2022/084666, filed Mar. 31, 2022, which claims priority to Chinese patent application No. 202110897477.4 filed Aug. 5, 2021. The contents of these applications are incorporated herein by reference in their entirety.

TECHNICAL FIELD

The present disclosure relates to the technical field of V2X, in particular to a method for processing data based on cooperative vehicle infrastructure system (CVIS), a method for applying for certificate based on CVIS, a device, a computer apparatus, and a readable medium.

BACKGROUND

Vehicle to X (V2X) data communication is intended for information transfer between the vehicle and the outside world. Vehicle to Anything has established a new development direction of automobile technology by integrating Global Positioning System (GPS) navigation technology, vehicle-to-vehicle communication technology, wireless communication and remote sensing technology, and the compatibility of manual driving and automatic driving can be achieved. V2X is the key technology of smart transportation system in the future, which enables communication between vehicles, communication between vehicles and base stations, and communication between base stations. Thereby, a series of traffic information such as real-time road conditions, road information, pedestrian information and the like, can be acquired, thus improving driving safety, reducing congestion, improving traffic efficiency, providing on-board entertainment information and the like.

An on-board unit (OBU) can receive a huge amount of V2X data from many sources. A significant number of resources are required to process the data. However, the OBU can only analyze and process the massive V2X data successively according to the order at which the data is received, resulting in delays in processing of some urgent and important data.

SUMMARY

Provided are a method for processing data based on cooperative vehicle infrastructure system (CVIS), a method for applying for certificate based on CVIS, a device, a computer apparatus, and a readable medium.

An embodiment of the present disclosure provides a method for processing data based on cooperative vehicle infrastructure system (CVIS), which is applied to a second on-board unit (OBU), the method may include, determining a message type of a first CVIS message in response to a reception of the first CVIS message and a certificate broadcast by a first OBU, acquiring a categorical attribute from the certificate; where the categorical attribute is the categorical attribute of a vehicle to which the first OBU belongs; determining a first processing priority of the first CVIS message corresponding to the categorical attribute according to a preset mapping relationship between the categorical attributes and the processing priorities; and processing the first CVIS message and the second CVIS message, according to the message type, the first processing priority, and the second processing priority of the second CVIS message that is being processed.

An embodiment of the present disclosure provides a method for applying for certificate based on cooperative vehicle infrastructure system (CVIS), which is applied to a first on-board unit (OBU), the method may include, determining, categorical attribute of a vehicle to which the first OBU belongs, in response to a presence of a certificate to be applied for; sending a request for certificate application including the categorical attribute to a certificate authority (CA) server; where the request is intended to request the CA server to generate a certificate including the categorical attribute; and acquiring a certificate generated by the CA server, so as to broadcast the first CVIS message along with the certificate; where the certificate is configured to enable a second OBU that receives the first CVIS message and the certificate to determine a first processing priority of the first CVIS message according to the categorical attribute in the certificate.

An embodiment of the present disclosure provides a second on-board unit (OBU), which may include a communication module, a first processing module, and a second processing module; where the communication module is configured to determine a message type of a first cooperative vehicle infrastructure system (CVIS) message in response to a reception of the first CVIS message and a certificate broadcast by a first OBU, and to acquire a categorical attribute from the certificate, where the categorical attribute is the categorical attribute of a vehicle to which the first OBU belongs; the first processing module is configured to determine a first processing priority of the first CVIS message corresponding to the categorical attribute according to a preset mapping relationship between a categorical attribute and a processing priority; and the second processing module is configured to process the first CVIS message and the second CVIS message, according to the message type, the first processing priority, and the second processing priority of the currently processed second CVIS message.

An embodiment of the present disclosure provides a first on-board unit (OBU), which may include a certificate management module, and a certificate application module; where the certificate management module is configured to determine a categorical attribute of the vehicle to which the first OBU belongs, in response to a presence of a certificate to be applied for; and the certificate application module is configured to send a request for certificate application including the categorical attribute to a certificate authority (CA) server; where the request is intended to request the CA server to generate a certificate including the categorical attribute; and to acquire a certificate generated by the CA server, so as to broadcast the first CVIS message along with the certificate; where, the certificate is configured to enable a second OBU that receives the first cooperative vehicle infrastructure system (CVIS) message and the certificate to determine a first processing priority of the first CVIS message according to the categorical attribute in the certificate.

An embodiment of the present disclosure provides a computer apparatus, which may include at least one processor, and a memory storing at least one program thereon, which when executed by the processor, causes the processor to carry out any one of the methods as described above.

An embodiment of the present disclosure provides a computer-readable medium storing at least one computer program, which when executed by a processor, causes the processor to carry out any one of the methods as described above.

DETAILED DESCRIPTION

Figure 1:
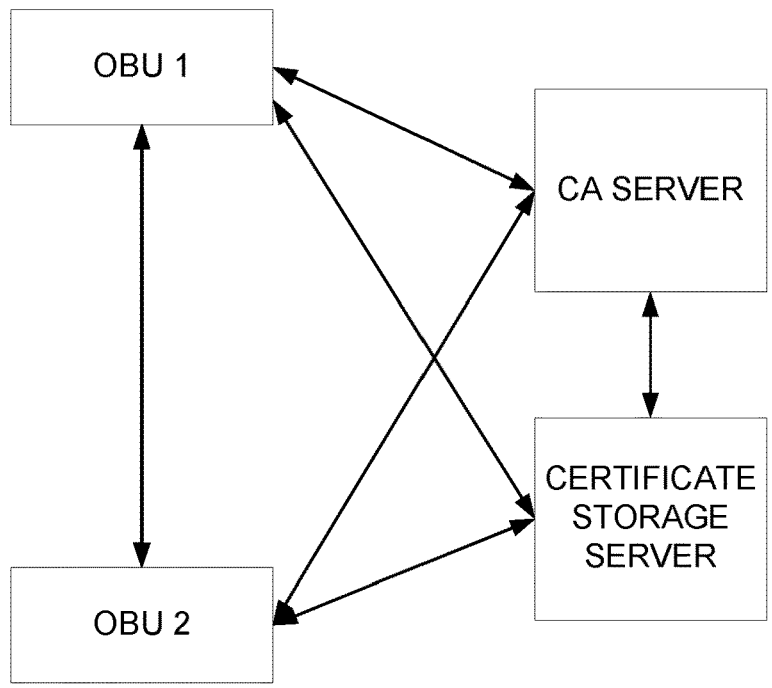
FIG. 1 depicts a diagram showing a system architecture according to an embodiment of the present disclosure.

Several embodiments will be described hereinafter with reference to the drawings, but the embodiments may be embodied in different forms and should not be construed as limitations to the embodiments set forth herein. Instead, these embodiments are provided to enable those having ordinary skills in the art to understand the scope of the present disclosure.

As used herein, the term "and/or" includes any and all combinations of one or more related enumerated items.

The terminology used herein is only intended to describe specific embodiments and is not intended to limit the present disclosure. As used herein, the singular forms "a" and "the" are also intended to include the plural forms unless the context clearly indicates otherwise. It will also be understood that when the terms "comprising" and/or "composed of" are used in this specification, the presence of the described features, integers, steps, operations, elements and/or components is specified, but the presence or addition of one or more other features, integers, steps, operations, elements, components and/or groups thereof is not excluded.

The embodiments described herein can be described with reference to a plan view and/or a cross-sectional view with the aid of an ideal schematic diagram of the present disclosure. Therefore, the illustration can be modified according to manufacturing technology and/or tolerance. Therefore, the embodiments are not limited to those shown in the drawings, but include modification of the configuration formed based on the manufacturing process. Therefore, the regions illustrated in the drawings have schematic properties, and the shapes of the regions shown in the drawings illustrate the specific shapes of regions of elements, but are not intended to be limiting.

Unless otherwise defined, all terms (including technical and scientific terms) used herein have the same meaning as commonly understood by those having ordinary skills in the art to which the present disclosure belongs. It will also be understood that terms such as those defined in commonly used dictionaries should be interpreted as having meanings consistent with their meanings in some conditions and the background of present disclosure, and will not be interpreted as having idealized or overly formal meanings, unless explicitly stated herein.

Since the communication mechanism in current CVIS does not prioritize the data sources, the OBU can only process the received massive data one by one. In this case, the data with more resources and lower priority takes up the resources of the data with higher priority, and the data with higher priority cannot be processed in time. In view of the above issues, an embodiment of the present disclosure provides a method for processing data based on CVIS, which is applicable to the system shown in FIG. 1. As shown in FIG. 1, the system includes a Certificate Authority (CA) server, a certificate storage server and an On-Board Unit (OBU). An embodiment of the present disclosure is illustrated with two OBUs (OBU 1 and OBU 2) positioned on different vehicles by way of an example. An embodiment of the present disclosure is illustrated with the V2X communications between a CA server and an OBU and between OBUs by way of an example. However, those having ordinary skills in the art know that any communication scheme that can realize CVIS communication is within the scope of the present disclosure. The CA server is configured to generate a certificate according to a request from an OBU. The certificate storage server is configured to store the certificates generated by the CA server. The OBU is configured to send vehicle information to another OBU, determine its own categorical attribute, determine from the certificate, the processing priority corresponding to the vehicle to which the peer OBU belongs, schedule resources to process V2X data and perform corresponding operations according to the processing priority, and download the certificate from the certificate storage server.

Figure 2:
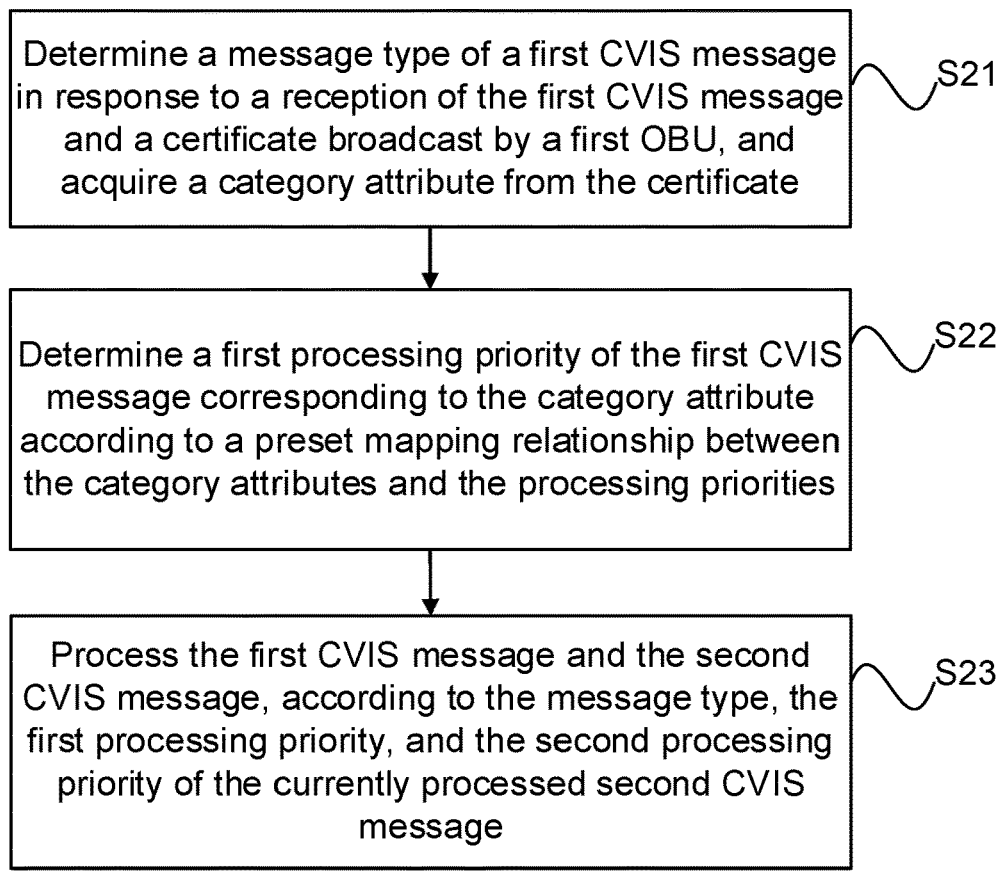
FIG. 2 depicts a flowchart showing a method for processing data based on CVIS according to an embodiment of the present disclosure.

As shown in FIG. 2, the method for processing data based on cooperative vehicle infrastructure system (CVIS) according to an embodiment of the present disclosure is applied to a second on-board unit (OBU). The method includes the following operations.

At operation S21, a message type of a first CVIS message is determined in response to a reception of the first CVIS message and a certificate broadcast by a first OBU, and a categorical attribute is acquired from the certificate.

It should be noted that the first OBU interacts with the second OBU by broadcasting the first CVIS message and the certificate. Before broadcasting the first CVIS message, the first OBU applies for a certificate from the CA server, and carries the categorical attribute of the vehicle to which the first OBU belongs within the request for certificate application. The CA server generates a certificate including the categorical attribute based on the request for certificate application, and stores the certificate in the certificate storage server. The first OBU downloads the certificate from the certificate storage server and loads the certificate locally.

In this operation, the second OBU, after receiving the first CVIS message and the certificate broadcast by the first OBU, determines the message type of the first CVIS message by parsing the first CVIS message. The message type is utilized to indicate the function of the first CVIS message. For example, if the message type is a data collection type, it indicates that the second OBU that received the first CVIS message is instructed to collect data. In this operation, the second OBU further obtains the categorical attribute of the vehicle to which the first OBU belongs by parsing the certificate. The categorical attribute indicates the purpose and function of vehicles. For example, a categorical attribute can indicate an ordinary vehicle, or a dedicated vehicle (such as a fire engine, a police car, an ambulance, a rescue vehicle, or the like).

At operation S22, a first processing priority of the first CVIS message corresponding to the categorical attribute is determined according to a preset mapping relationship between the categorical attributes and the processing priorities.

The mapping relationship between categorical attributes and processing priorities is pre-stored in the second OBU. In this operation, the second OBU inquires the locally stored mapping relationship between categorical attributes and processing priorities according to the categorical attribute obtained at operation S21, and obtains the corresponding processing priority that is the first processing priority of the first CVIS message received at operation S21.

At operation S23, the first CVIS message and the second CVIS message are processed, according to the message type, the first processing priority, and the second processing priority of the currently processed second CVIS message.

In this operation, if the second OBU is currently processing the second CVIS message, the processing order of the first CVIS message and the second CVIS message is determined according to the currently obtained message type and the first processing priority of first CVIS message, and the second processing priority of the second CVIS message that is being processed, that is to determine which CVIS message is processed with priority.

The method for processing data based on CVIS provided in an embodiment of the present disclosure includes, determining a message type of a first CVIS message in response to a reception of the first CVIS message and a certificate broadcast by a first OBU, acquiring a categorical attribute is acquired from the certificate where the categorical attribute is the categorical attribute of the vehicle to which the first OBU belongs; determining a first processing priority of the first CVIS message corresponding to the categorical attribute according to a preset mapping relationship between the categorical attributes and the processing priorities; and processing the first CVIS message and the second CVIS message according to the message type, the first processing priority, and the second processing priority of the currently processed second CVIS message. According to an embodiment of the present disclosure, the processing priority of the CVIS message is assigned to the vehicle to which the OBU belongs, and the priority of the first CVIS message is determined according to the categorical attribute of the vehicle to which the first OBU that sends the first CVIS message belongs. Hence, the data sent by a specific type of vehicle can be preferentially processed among massive CVIS messages, and the inefficiency in processing urgent and important data in time can be addressed.

In some embodiments, processing the first CVIS message and the second CVIS message according to the message type, the first processing priority and the second processing priority of the currently processed second CVIS message (i.e., operation S23) includes, suspending processing the second CVIS message and starting processing the first CVIS message, in response to the message type being a preset type and the first processing priority being greater than the second processing priority; and processing the first CVIS message after the second CVIS message is processed, in response to the message type being a non-preset type or the message type being the preset type and the first processing priority being less than or equal to the second processing priority.

Figure 3:
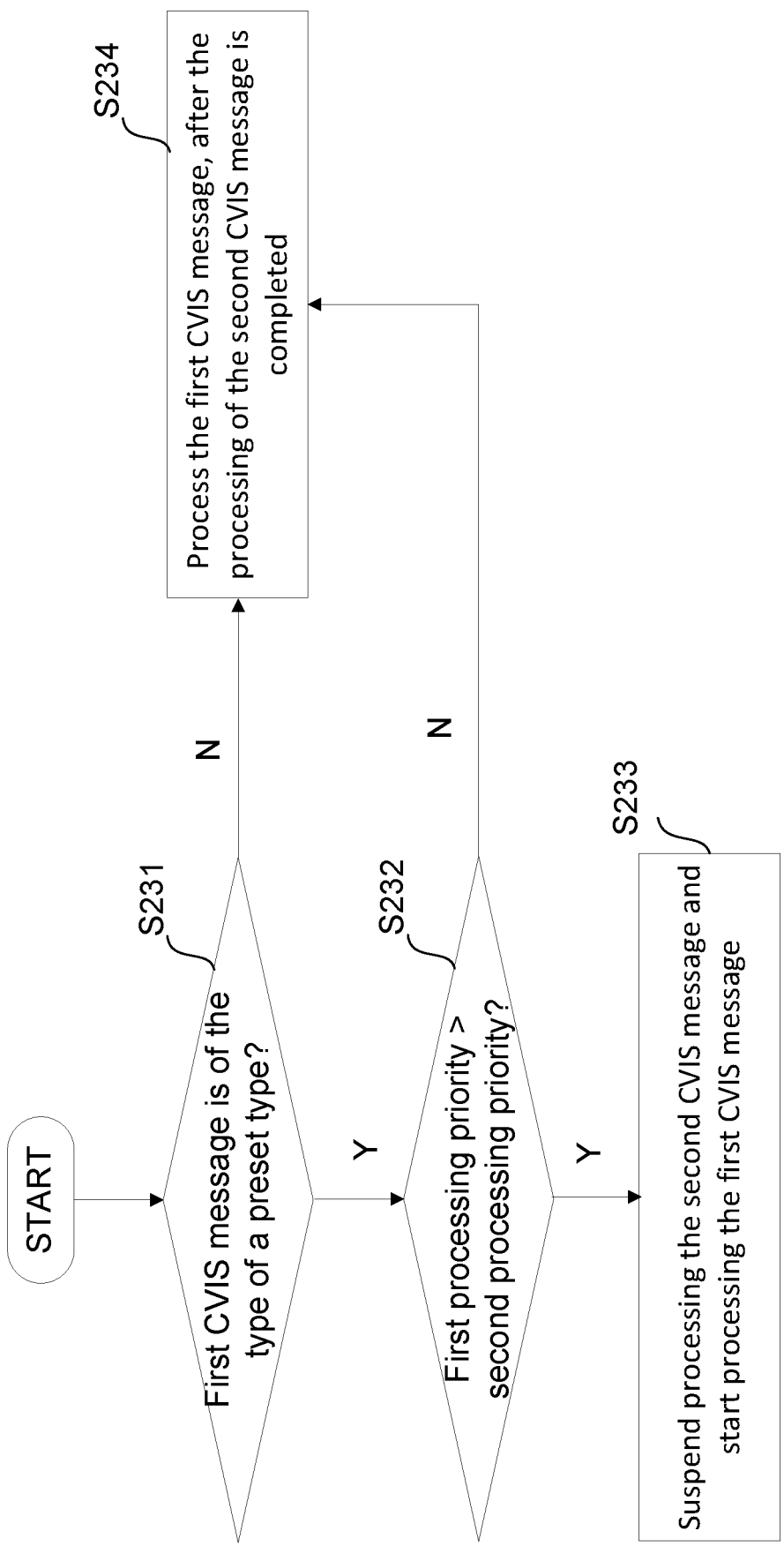
FIG. 3 depicts a schematic flow chart showing the processing of the first and second CVIS messages according to an embodiment of the present disclosure.

The processing of the first CVIS message and the second CVIS message according to an embodiment of the present disclosure, will be described with details, with reference to FIG. 3. As shown in FIG. 3, the processing of the first CVIS message and the second CVIS message according to the message type, the first processing priority, and the second processing priority of the currently processed second CVIS message (i.e., operation 23) includes the following operations.

At operation S231, a determination is performed as to whether the message type of the first CVIS message is a preset type, operation S232 is performed in response to a determination that the message type of the first CVIS message is a preset type, and operation S234 is performed in response to a determination that the message type of the first CVIS message is a non-preset type.

In an embodiment of the present disclosure, the preset type of message refers to the message that is to be processed with resource preemption.

In this operation, if the message type of the first CVIS message is a preset type, that indicates the first CVIS message shall preempt the resources of the second OBU for data processing. Then it is necessary to further determine the processing priority (i.e., operation S232 is performed). If the message type of the first CVIS message is a non-preset type, that indicates the first CVIS message shall not preempt the resources of the second OBU for data processing, then the CVIS messages are processed according to the order at which they are received (i.e., operation S234 is performed).

At operation S232, the first processing priority is compared with the second processing priority, operation S233 is performed in response to a determination that the first processing priority is greater than the second processing priority; and operation S234 is performed in response to a determination that the first processing priority is not greater than the second processing priority.

In this operation, if the second OBU determines that the first processing priority of the first CVIS message is greater than the second processing priority of the second CVIS message currently being processed, task scheduling is needed to give priority to the first CVIS message with higher processing priority (i.e., operation S233 is performed). If the second OBU determines that the first processing priority is less than or equal to the second processing priority, task scheduling is not necessary, and it is only necessary to process the CVIS messages according to the order in which they are received (i.e., operation S234 is performed).

At operation S233, processing of the second CVIS message is suspended and the first CVIS message is processed.

At operation S234, the first CVIS message is processed, after the processing of the second CVIS message is completed.

In this operation, the second OBU starts to process the first CVIS message after the processing of the second CVIS message is completed and resources are released.

In some embodiments, the preset type includes at least one of, a message type for controlling the OBU, or a message type for controlling the vehicle to which the OBU belongs. For example, the message for controlling the OBU may include the message for controlling the OBU to restart, or perform version upgrade, and the message for controlling the vehicle to which the OBU belongs may include the message for controlling the vehicle movement, for example, controlling the acceleration/deceleration, stop, steering, lights on/off of the vehicle, etc.

In some embodiments, the categorical attributes may include a first category and a second category. A vehicle of the first category is a dedicated vehicle for emergency tasks, such as a fire engine, a police car, an ambulance, a rescue vehicle, etc. A vehicle of the second category is an ordinary vehicle, and the processing priority corresponding to the first category is greater than that corresponding to the second category. The priority of a CVIS message sent by a vehicle for emergency tasks is higher than that of a CVIS message sent by an ordinary vehicle. In this way, priority can be given to urgent and important messages, ensuring the safety of vehicles and the safety of people's lives and property in public emergencies.

Figure 4:
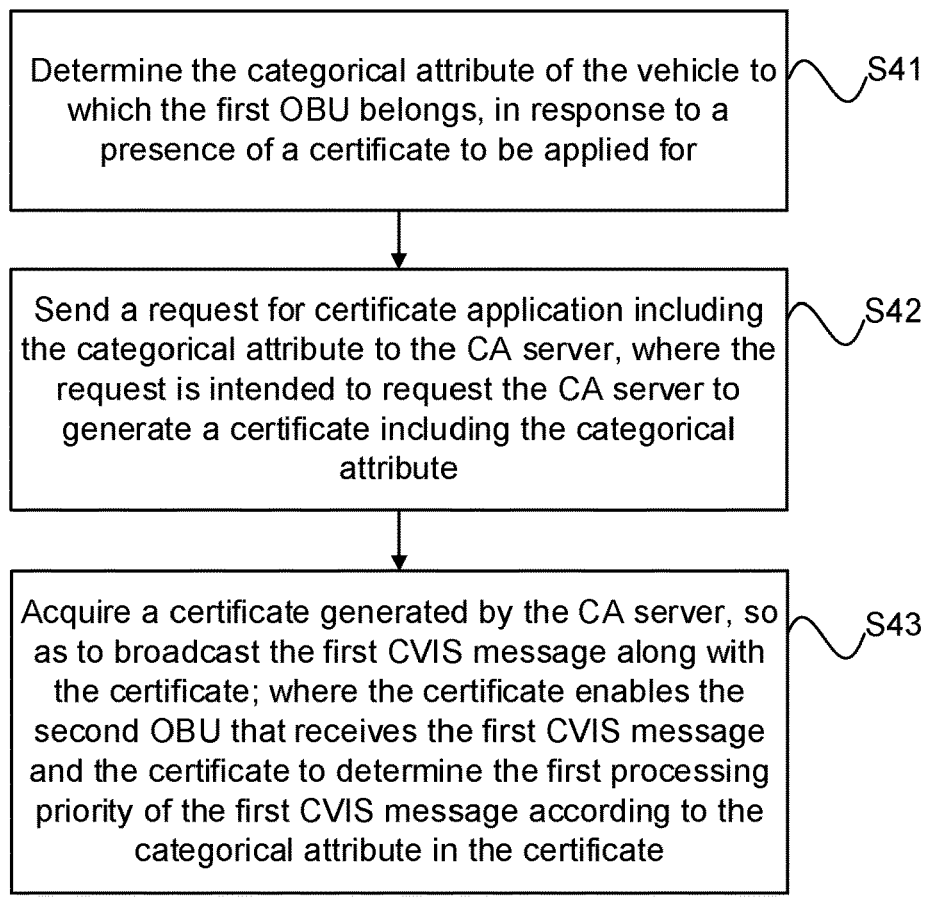
FIG. 4 depicts a flowchart showing a method for applying for certificate based on CVIS according to an embodiment of the present disclosure.

An embodiment of the present disclosure provides a method for applying for certificate based on CVIS, which is applied to a first OBU. As shown in FIG. 4, and the method includes the following operations.

At operation S41, the categorical attribute of the vehicle to which the first OBU belongs is determined, in response to a presence of a certificate to be applied for.

The OBU has a set of certificates including a plurality of certificates. The set of certificates is composed of a plurality of certificates downloaded by the OBU from a certificate storage server. The types of certificates in the set of certificates include valid certificates and certificates to be applied for. A valid certificate refers to a certificate that is currently in a valid state, that is, the expiration time of that certificate is after the current time. A certificate to be applied for refers to a certificate that meets a preset condition.

The first OBU having a certificate to be applied for, includes two situations. One is the situation that the first OBU has downloaded some certificates and the certificate to be applied for presents in the downloaded certificates. In this case, certificates are present in the set of certificates, but at least some certificates in the set of certificates meet the preset condition, for example, some certificates have expired or are about to expire. Another condition where the first OBU has a certificate to be applied for is that the first OBU has not downloaded any certificate yet, and the set of certificates is empty, that is, no certificate is contained therein.

Since the categorical attribute of the vehicle to which the first OBU belongs is reported when a certificate is being applied for from the CA server, in this operation, the categorical attribute of the vehicle to which the first OBU belongs is determined when the certificate to be applied for exists. In some embodiments, the categorical attribute is stored in the first OBU, and the categorical attribute of the vehicle to which the first OBU belongs can be obtained by reading the values of the related attribute fields.

At operation S42, a request for certificate application including the categorical attribute is sent to the CA server, the request is intended to request the CA server to generate a certificate including the categorical attribute.

In this operation, the first OBU sends the request for certificate application, which carries the categorical attribute, to the CA server, so that the CA server can generate a certificate including the categorical attribute. It should be noted that the request for certificate application can further include information such as a public key.

At operation S43, a certificate generated by the CA server is acquired, so as to broadcast the first CVIS message along with the certificate. The certificate enables the second OBU that receives the first CVIS message and the certificate to determine the first processing priority of the first CVIS message according to the categorical attribute in the certificate.

In this operation, after receiving the response of the certificate application by the CA server, the first OBU obtains the download information carried therein, and downloads the certificate according to the download information that may include the download address (i.e., the address of the certificate storage server) and the download time. After generating the first CVIS message, the first OBU signs the first CVIS message according to the private key and certificate of the first OBU to obtain the signed first CVIS message, and broadcasts the certificate and the signed first CVIS message.

After receiving the first CVIS message and the certificate broadcast by the first OBU, the second OBU can verify the validity of the certificate according to the CA root certificate, for example, to check whether the certificate is issued by the CA root certificate, or whether the certificate is within the validity period, etc. If the verification passes, the public key and categorical attribute are obtained from the certificate, and the signature of the first CVIS message is verified according to the public key. After the signature verification passes, the first CVIS message is parsed to obtain the message type. The second OBU determines a first processing priority of the first CVIS message corresponding to the categorical attribute according to a preset mapping relationship between the categorical attributes and the processing priorities; and processes the first CVIS message and the second CVIS message according to the message type, the first processing priority, and the second processing priority of the second CVIS message that is being processed.

The method for applying for certificate based on cooperative vehicle infrastructure system (CVIS) set forth in an embodiment of the present disclosure, is applied to a first on-board unit (OBU), the method includes, determining, categorical attribute of a vehicle to which the first OBU belongs, in response to a presence of a certificate to be applied for; sending a request for certificate application including the categorical attribute to a certificate authority (CA) server; where the request is intended to request the CA server to generate a certificate including the categorical attribute; and acquiring a certificate generated by the CA server, so as to broadcast the first CVIS message along with the certificate; where the certificate is configured to enable a second OBU that receives the first CVIS message and the certificate to determine a first processing priority of the first CVIS message according to the categorical attribute in the certificate. In an embodiment of the present disclosure, the categorical attribute of the vehicle to which the OBU belongs is reported when applying for the certificate, so as to generate a certificate including the categorical attribute. As such, the vehicle at the data receiving end is informed with the category of the vehicle at the data sending end during the CVIS communication, so as to enable the vehicle at the data receiving end to determine the data processing priority, so that the data sent by a specific category of vehicles can be preferentially processed among massive CVIS messages, and the inefficiency in processing urgent and important data in time can be addressed.

In some embodiments, the method for applying for certificate based on CVIS further includes, configuring the categorical attribute of a vehicle to which the first OBU belongs according to the categorical attribute carried in a categorical attribute configuration instruction, in response to a reception of the categorical attribute configuration instruction. Through the categorical attribute configuration instruction, the category of the vehicle can be flexibly changed in the OBU, which is suitable for the case of a removable OBU and for the case where a vehicle is temporarily requisitioned as a vehicle for handling emergency tasks.

In some embodiments, the categorical attributes may include a first category and a second category. A vehicle of the first category is a dedicated vehicle for emergency tasks, such as a fire engine, a police car, an ambulance, a rescue vehicle, etc. A vehicle of the second category is an ordinary vehicle, and the processing priority corresponding to the first category is greater than that corresponding to the second category. The priority of a CVIS message sent by a vehicle for emergency tasks is higher than that of a CVIS message sent by an ordinary vehicle. In this way, priority can be given to urgent and important messages, ensuring the safety of vehicles and the safety of people's lives and property in public emergencies.

The technical scheme set forth in an embodiment of the present disclosure can be applied to secure communication between OBUs based on V2X protocol. The OBUs need to support V2X communication protocol, and the secure communication mechanism is to sign V2X data through certificates and to verify the signatures. Wireless or wired network communication shall be supported between the OBU and the CA server. Certificate application and download should be carried out according to a security protocol. The V2X secure communication protocol based on certificate authentication is supported between OBUs, achieving data priority processing of high-priority devices in V2X secure communication.

An embodiment of the present disclosure proposes a method for processing data based on CVIS and a method for applying for certificate based on CVIS. In view of the fact that the V2X secure communication between OBUs requires certificates, a scheme for generating certificates by means of the categorical attribute of a vehicle to which an OBU belongs, is proposed. The priority of V2X data is assigned according to the categorical attribute, then the V2X data is processed according to the priority, so that data from high-priority devices in V2X secure communication can be processed with priority. For example, the priority of V2X data of dedicated vehicles such as police cars, ambulances and rescue vehicles is higher than that of ordinary vehicles. Ensuring the timely processing of information of these vehicles can ensure safe driving and avoid traffic jams and life-threatening problems.

Figure 5:
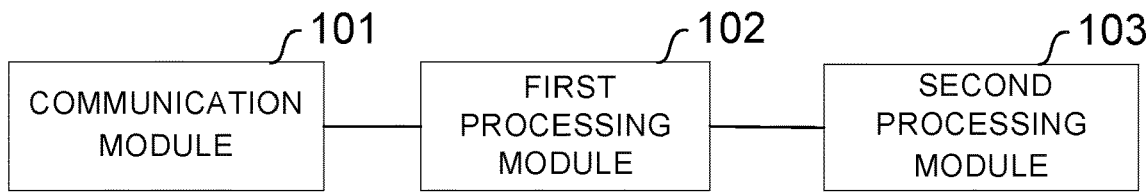
FIG. 5 depicts a schematic diagram showing a second OBU according to an embodiment of the present disclosure.

Based on the same technical concept, an embodiment of the present disclosure provides an OBU, which is a second OBU. As shown in FIG. 5, the OBU includes a communication module 101, a first processing module 102, and a second processing module 103. The communication module 101 is configured to determine a message type of a first CVIS message in response to a reception of the first CVIS message and a certificate broadcast by a first OBU, and to acquire a categorical attribute from the certificate, where the categorical attribute is the categorical attribute of the vehicle to which the first OBU belongs.

The first processing module 102 is configured to determine a first processing priority of the first CVIS message corresponding to the categorical attribute according to a preset mapping relationship between the categorical attributes and the processing priorities.

The second processing module 103 is configured to process the first CVIS message and the second CVIS message, according to the message type, the first processing priority, and the second processing priority of the currently processed second CVIS message.

In some embodiments, the second processing module 103 is configured to suspend the processing of the second CVIS message and to start processing the first CVIS message, in response to the message type being a preset type and the first processing priority being greater than the second processing priority.

In some embodiments, the second processing module 103 is configured to process the first CVIS message after the second CVIS message is processed, in response to the message type being a non-preset type or the message type being the preset type and the first processing priority being less than or equal to the second processing priority, In some embodiments, the preset type includes at least one of, a message type for controlling the OBU, or a message type for controlling the vehicle to which the OBU belongs.

In some embodiments, the categorical attributes may include a first category and a second category. A vehicle of the first category is a dedicated vehicle for emergency tasks, and the processing priority corresponding to the first category is greater than that corresponding to the second category.

Figure 6:
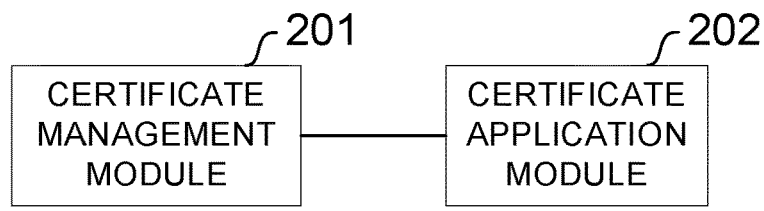
FIG. 6 depicts a first schematic diagram of a first OBU according to an embodiment of the present disclosure.

Based on the same technical concept, an embodiment of the present disclosure provides an OBU, which is a first OBU. As shown in FIG. 6, the OBU includes a certificate management module 201, and a certificate application module 202. The certificate management module 201 is configured to determine the categorical attribute of the vehicle to which the first OBU belongs, in response to a presence of a certificate to be applied for.

The certificate application module 202 is configured to send a request for certificate application including the categorical attribute to a certificate authority (CA) server; where the request is intended to request the CA server to generate a certificate including the categorical attribute; and to acquire a certificate generated by the CA server, so as to broadcast the first CVIS message along with the certificate; where the certificate is configured to enable a second OBU that receives the first CVIS message and the certificate to determine a first processing priority of the first CVIS message according to the categorical attribute in the certificate.

Figure 7:
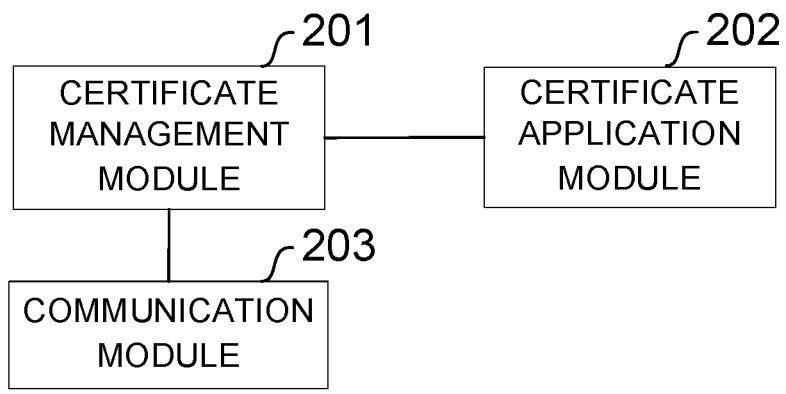
FIG. 7 depicts a second schematic diagram of a first OBU according to an embodiment of the present disclosure.

In some embodiments, as shown in FIG. 7, the OBU further includes an attribute configuration module 203 configured to configure the categorical attribute of the vehicle to which the first OBU belongs according to the categorical attribute carried in the categorical attribute configuration instruction, in response to a reception of the categorical attribute configuration instruction.

In some embodiments, the categorical attributes may include a first category and a second category. A vehicle of the first category is a dedicated vehicle for emergency tasks, and the processing priority corresponding to the first category is greater than that corresponding to the second category.

An embodiment of the present disclosure provides a computer apparatus, which includes at least one processor, and a storage device storing at least one program thereon, which when executed by the processor, causes the processor to carry out any one of the methods as described above.

An embodiment of the present disclosure provides a computer-readable medium storing a computer program which, when executed by a processor, causes the processor to carry out the method described in any one embodiment of the present disclosure.

The method for processing data based on CVIS provided in an embodiment of the present disclosure includes, determining a message type of a first CVIS message in response to a reception of the first CVIS message and a certificate broadcast by a first OBU, acquiring a categorical attribute is acquired from the certificate where the categorical attribute is the categorical attribute of the vehicle to which the first OBU belongs; determining a first processing priority of the first CVIS message corresponding to the categorical attribute according to a preset mapping relationship between the categorical attributes and the processing priorities; and processing the first CVIS message and the second CVIS message according to the message type, the first processing priority, and the second processing priority of the currently processed second CVIS message. According to an embodiment of the present disclosure, the processing priority of the CVIS message is assigned to the vehicle to which the OBU belongs, and the priority of the first CVIS message is determined according to the categorical attribute of the vehicle to which the first OBU that sends the first CVIS message belongs. Hence, the data sent by a specific type of vehicle can be preferentially processed among massive CVIS messages, and the inefficiency in processing urgent and important data in time can be addressed.

| It shall be appreciated by a person having ordinary skills in the art that all or some of the steps, functional modules/units in the methods and devices disclosed above can be implemented as software, firmware, hardware and their appropriate combinations. In the hardware implementation, the division between functional modules/units mentioned in the above description does not necessarily correspond to the division of physical components. For example, a physical component may have multiple functions, or a function or step may be performed by several physical components in cooperation. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be configured to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Several embodiments have been disclosed, and some specific terms are used herein. However, those terms are only intended and should only be interpreted in a general illustrative sense, and are not limiting. In some instances, it is apparent to those having ordinary skills in the art that the features, characteristics and/or elements described in connection with specific embodiments can be used alone or in combination with those described in respect of other embodiments, unless otherwise explicitly noted. Therefore, it will be understood by those having ordinary skills in the art that various changes in form and details can be made without departing from the scope of the present disclosure as set forth in the appended claims.

What is claimed is:

1. A method for processing data based on cooperative vehicle infrastructure system (CVIS), which is applied to a second on-board unit (OBU), the method comprising,
    determine a message type of a first CVIS message in response to a reception of both the first CVIS message and a certificate broadcast by a first OBU, and acquiring a categorical attribute from the certificate; wherein the categorical attribute is the categorical attribute of a vehicle to which the first OBU belongs;
    determining a first processing priority of the first CVIS message corresponding to the categorical attribute according to a preset mapping relationship between a categorical attribute and a processing priority; and
    processing the first CVIS message and a second CVIS message, according to the message type, the first processing priority, and a second processing priority of the second CVIS message that is currently being processed.

2. The method as claimed in claim 1, wherein processing the first CVIS message and the second CVIS message, according to the message type, the first processing priority, and the second processing priority of the second CVIS message that is currently being processed, comprises,
    suspending processing the second CVIS message and starting processing the first CVIS message, in response to a determination that the message type is a preset type and the first processing priority is greater than the second processing priority.

3. The method as claimed in claim 2, wherein, the preset type comprises at least one of, a message type for controlling an OBU, or a message type for controlling a vehicle to which the OBU belongs.

4. The method as claimed in claim 3, wherein, the message type for controlling the OBU at least comprises a message for controlling the OBU to restart, or a message for controlling the OBU to perform version upgrade, and
    the message type for controlling the vehicle to which the OBU belongs at least comprises a message for controlling the vehicle movement.

5. The method as claimed in claim 4, wherein, the message for controlling the vehicle movement at least comprises, the message for controlling one of, celebration, deceleration, stop, steering, or lights on/off of the vehicle.

6. The method as claimed in claim 2, wherein the categorical attribute comprises a first category and a second category; and
    a vehicle of the first category is a dedicated vehicle for an emergency task, and a processing priority corresponding to the first category is greater than a processing priority corresponding to the second category.

7. The method as claimed in claim 1, wherein the categorical attribute comprises a first category and a second category; and
    a vehicle of the first category is a dedicated vehicle for an emergency task, and a processing priority corresponding to the first category is greater than a processing priority corresponding to the second category.

8. The method as claimed in claim 1, wherein processing the first CVIS message and the second CVIS message, according to the message type, the first processing priority, and the second processing priority of the second CVIS message that is currently being processed, comprises,
    processing the first CVIS message after processing of the second CVIS message is completed, in response to a determination that the message type is a non-preset type, or a determination that the message type is a preset type and the first processing priority is less than or equal to the second processing priority.

9. The method as claimed in claim 8, wherein, the preset type comprises at least one of, a message type for controlling an OBU, or a message type for controlling a vehicle to which the OBU belongs.

10. The method as claimed in claim 8, wherein the categorical attribute comprises a first category and a second category; and
a vehicle of the first category is a dedicated vehicle for an emergency task, and a processing priority corresponding to the first category is greater than a processing priority corresponding to the second category.

11. An electronic device, comprising,
at least one processor; and
a memory configured to store at least one program which, when executed by the at least one processor, causes the at least one processor to carry out the method as claimed in claim 1.

12. A non-transitory computer readable medium storing a computer program thereon, which when executed by a processor, causes the processor to carry out the method as claimed in claim 1.

13. A method for applying for certificate based on cooperative vehicle infrastructure system (CVIS), which is applied to a first on-board unit (OBU), the method comprising,
determining, a categorical attribute of a vehicle to which the first OBU belongs, in response to a presence of a certificate to be applied for;
sending a request for certificate application comprising the categorical attribute to a certificate authority (CA) server; wherein the request is intended to request the CA server to generate a certificate comprising the categorical attribute; and
acquiring a certificate generated by the CA server, so as to broadcast a first CVIS message along with the certificate;
wherein, the certificate is configured to enable a second OBU that receives the first CVIS message and the certificate to determine a first processing priority of the first CVIS message according to the categorical attribute in the certificate.

14. The method as claimed in claim 13, further comprising,
configuring the categorical attribute of the vehicle to which the first OBU belongs according to the categorical attribute carried in a categorical attribute configuration instruction, in response to a reception of the categorical attribute configuration instruction.

15. The method as claimed in claim 14, wherein the categorical attribute comprises a first category and a second category; and
a vehicle of the first category is a dedicated vehicle for an emergency task, and a processing priority corresponding to the first category is greater than a processing priority corresponding to the second category.

16. The method as claimed in claim 13, wherein the categorical attribute comprises a first category and a second category; and
a vehicle of the first category is a dedicated vehicle for an emergency task, and a processing priority corresponding to the first category is greater than a processing priority corresponding to the second category.

17. An electronic device, comprising,
at least one processor; and
a memory configured to store at least one program which, when executed by the at least one processor, causes the at least one processor to carry out the method as claimed in claim 13.

18. A non-transitory computer readable medium storing a computer program thereon, which when executed by a processor, causes the processor to carry out the method as claimed in claim 13.

19. The method as claimed in claim 13, further comprising,
performing a verification, by the second OBU, on a validity of the certificate, after receiving the first CVIS message and the certificate broadcast by the first OBU;
obtaining a public key and the categorical attribute from the certificate, in response to a passing of the verification;
performing a verification, on the first CVIS message according to the public key; and
parsing the first CVIS message to obtaining a message type of the first CVIS message.

20. The method as claimed in claim 13, further comprising
signing the first CVIS message according to a private key and the certificate of the first OBU to obtain the signed first CVIS message, after acquiring the certificate generated by the CA server; and
broadcasting the certificate and the signed first CVIS message.

* * * * *